(12) United States Patent
Miksa et al.

(10) Patent No.: US 8,958,980 B2
(45) Date of Patent: Feb. 17, 2015

(54) METHOD OF GENERATING A GEODETIC REFERENCE DATABASE PRODUCT

(75) Inventors: Krzysztof Miksa, Lodz (PL); Jay Clark, Lebanon, NH (US); James Edward Hagan, Grantham, NH (US)

(73) Assignees: TomTom Polska Sp. z o.o., Warsaw (PL); TomTom North America, Inc., Lebanon, NH (US)

(*) Notice: Subject to any disclaimer, the term of this patent is extended or adjusted under 35 U.S.C. 154(b) by 340 days.

(21) Appl. No.: 13/132,935

(22) PCT Filed: Dec. 9, 2008

(86) PCT No.: PCT/US2008/013502
§ 371 (c)(1),
(2), (4) Date: Jul. 26, 2011

(87) PCT Pub. No.: WO2010/068186
PCT Pub. Date: Jun. 17, 2010

(65) Prior Publication Data
US 2011/0282578 A1 Nov. 17, 2011

(51) Int. Cl.
*G01C 21/28* (2006.01)
*G06F 17/30* (2006.01)
*G01S 17/89* (2006.01)
*G01S 13/89* (2006.01)
*G01C 11/04* (2006.01)

(52) U.S. Cl.
CPC ........... *G06F 17/30241* (2013.01); *G01S 17/89* (2013.01); *G01S 13/89* (2013.01); *G01C 11/04* (2013.01)
USPC .............. 701/409; 348/42; 348/144; 345/679

(58) Field of Classification Search
USPC .............. 701/409, 49; 348/42, 144; 382/294, 382/284, 103; 356/6; 345/679
See application file for complete search history.

(56) References Cited

U.S. PATENT DOCUMENTS 6,125,329 A * 9/2000 Place et al. .................. 702/5
6,757,445 B1 * 6/2004 Knopp .......................... 382/285
(Continued)

OTHER PUBLICATIONS

International Search Report of PCT/US2008/013502, search carried out by the EPO on Apr. 23, 2009.
(Continued)

*Primary Examiner* — Tuan C. To

(57) ABSTRACT

A method of generating a geodetic reference database product is disclosed The method comprises acquiring mobile mapping data captured by means of digital cameras, range sensors and position determination means including GPS and IMU mounted to a vehicle driving across the earth surface, the mobile mapping data comprising simultaneously captured image data, range data and associated position data in a geographic coordinate system. Linear stationary earth surface features are derived from the mobile mapping data by processing the image data, range data and associated position data. 3D-models are generated for the linear stationary earth surface features in the geographic coordinate system from the image data, range data and associated position data and stored in a database to obtain the geodetic reference database product. A 3D-model could include an image representing the colors of the surface of the 3D model or a set of smaller images representing photo-identifiable objects along the model. The 3D-models could be used to rectify aerial imagery, to correct digital elevation models and to improve the triangulation of digital elevation models.

15 Claims, 7 Drawing Sheets

(56) References Cited

U.S. PATENT DOCUMENTS

| | | | |
|---|---|---|---|
| 7,089,198 B2* | 8/2006 | Freedenberg et al. | 705/26.3 |
| 7,127,348 B2* | 10/2006 | Smitherman et al. | 701/409 |
| 7,440,591 B1* | 10/2008 | McCusker | 382/109 |
| 7,873,240 B2* | 1/2011 | Oldroyd | 382/294 |
| 8,194,922 B2* | 6/2012 | Jamison et al. | 382/103 |
| 8,315,477 B2* | 11/2012 | Acree | 382/284 |
| 2002/0060784 A1* | 5/2002 | Pack et al. | 356/6 |
| 2004/0057633 A1* | 3/2004 | Mai et al. | 382/284 |
| 2006/0200308 A1* | 9/2006 | Arutunian | 701/208 |
| 2007/0104354 A1* | 5/2007 | Holcomb | 382/109 |
| 2007/0160957 A1* | 7/2007 | Wen | 433/213 |
| 2007/0237420 A1* | 10/2007 | Steedly et al. | 382/284 |
| 2007/0253639 A1* | 11/2007 | Statter | 382/276 |
| 2009/0074254 A1* | 3/2009 | Jamison et al. | 382/113 |
| 2009/0154793 A1* | 6/2009 | Shin et al. | 382/154 |
| 2010/0283853 A1* | 11/2010 | Acree | 348/144 |

OTHER PUBLICATIONS xp002521410, Visat: Mapping what you see, Naser Ei-Sheimy, Taher Hassan and Martin Lavigne.

xp002521411, Automatic Road Vector Extraction for Mobile Mapping Systems Wang Cheng, T. Hassan, N. Ei-Sheimy and M. Lavigne.

* cited by examiner

METHOD OF GENERATING A GEODETIC REFERENCE DATABASE PRODUCT

This application is the National Stage of International Application No. PCT/US2008/013502, filed Dec. 9, 2008 and designating the United States. The entire contents of this application is incorporated herein by reference.

FIELD OF THE INVENTION

The present invention relates to the field of generating a geodetic reference database product.

The invention further relates to a computer implemented system for generating a geodetic reference database product, a geodetic reference database product, a computer program product and a processor readable medium provided with the computer program product or the geodetic reference database product. A geodetic reference database product can be useful when orthorectifying different images of the same geographic area

BACKGROUND OF THE INVENTION

Ground control points (GCP's) are used in orthorectifying satellite, aerial or aero survey imagery to standard map projections. A ground control point can be any point on the surface of the earth which is recognizable on remotely sensed images, maps or aerial photographs and which can be accurately located on each of these. A ground control point has defined associated coordinates in a coordinate reference systems A ground control point is a point on the surface of the earth of known location (i.e. fixed within an established coordinate reference system). GCP's are used to geo-reference image data sources, such as remotely sensed images or scanned maps, and divorced survey grids, such as those generated during geophysical survey. A GCP could be:

- a copy of a part of a paper map showing a selected point and its surrounding;
- an image chip from a scanned map showing a selected point and its surrounding;
- an image chip from a digital map showing a selected point and its surrounding;
- a written description or sketch of the selected point
- an image from an aerial/satellite or ground based photo showing a selected point and its surrounding; or
- any other representation of a specific location suitable documented so as to be recognizable in an aerial/satellite image or planimetric map.

A GCP can be any photo-recognizable feature to identify one point having associated precise X, Y and Z coordinates in a coordinate reference system. A GCP describes an earth surface feature which is clearly identifiable in a satellite or aerial imagery. The most significant requirement for a GCP is it's visibility in the image to be orthorectified. A secondary characteristic is that it be durable. A GCP should ideally have a size which is at least 4 times the size of a pixel in the image to be orthorectified. Earth surface features used for defining GCP's can be cultural features, line features and natural features.

A cultural (man made) feature is usually the best point to use as GCP. It covers road intersections, road and rail road intersections, road and visible biogeographic boundary intersections, such as the intersection of a road and the boundary line between a forest and an agricultural field, intersections, river bridges, large low buildings (hangars, industrial buildings, etc), airports, etcetera.

In present application line features could be used when they have well defined edges in the imagery. The GCP is normally selected as a center of the intersection of two line features. The two line features forming the intersection have to cross with an angle larger than 60 degrees.

Natural features are generally not preferred because of their irregular shapes. It may however be necessary to use natural features in areas lacking suitable cultural features. If a natural feature has well defined edges, it may be used as a GCP. It could be forest boundaries forest paths, forest clearings, river confluence, etc. When selecting such points it must to be taken into account that certain boundaries can be subject to variations (forest, water bodies) in time. In situations where there are insufficient suitable features, it is possible for the surveyor to create an observable feature for the purpose of identifying a GCP.

To geo-reference or rectify aerial or satellite imagery, a set of GCP's has to be selected for each image. The GCP's of a set should be uniformly selected in the image. Points near the edges of an image should be selected and preferably with even distribution in the image. The set of GCP's should preferably also respect terrain variations in the scene, i.e. select point at both highest and lowest elevations.

GCP's could be generated by a human going into the field and gathering both an image or corresponding description of the GCP and the corresponding X, Y and Z coordinate in a coordinate reference system by a position determination means of for example a GPS receiver. In "Accurate mapping of Ground Control Point for Image Rectification and Holistic Planned Grazing Preparation" by Jed Gregory, et al., GIS Training and Research Center, Idaho State University Pocatello, ID 83209-8130, October 2006, GCP's had to be established and their exact spatial location recorded to ensure accurate georectification of the imagery. Ten GCP's were setup strategically throughout the area to be georectified. The GCP's were setup using two strips of plastic, six inches wide and six feet long, laid across each other in the shape of a cross (+). All GCP's were oriented with each arm of the cross pointing in one of the four cardinal directions (north, south, east, west). After placement of each GCP a GPS location was recorded at the center of the cross using a Trimble GeoXT GPS unit. Said document makes clear the huge amount of time and effort that is necessary to collect accurate GCP's.

There are basically two corrections that are made in an orthorectification process. Orthorectification is the transformation of a perspective view image into an image wherein each pixel has a known XY-position on the geoid describing the earth surface and wherein each pixel is regarded to be viewed perpendicular to the earth surface in said XY-position. First, any shifts (translation and rotation errors) tilts or scale problems can be corrected and second the distortion effects of elevation changes can be corrected. In current orthorectification processes applied to images, elevation distortion is the major cause of horizontal errors. This is illustrated in FIG. 1. A camera mounted in an aircraft 1 records perspective view images of the earth surface 2 (shown here in profile). However, only one pixel in the image can be representing an orthogonal view of the earth surface and the other pixels are all angled view representations of the earth surface. FIG. 1 shows a profile of the earth surface for a given y coordinate. Horizontal line 3 is assumed to represent a profile of a reference surface of the earth for the given y coordinate in a coordinate reference system, for example WGS84 or any other geoid describing the earth surface in a coordinate reference system. Shown is a building structure 4, for example a bridge, on the earth surface whose xyz position on the earth surface 2 and height are known. Furthermore, the position and orientation in the coordinate reference system of the capturing point 5 of the aerial image is known (for example by means of accurate GPS and/or other position/orientation determination means). By means of geometry, it is possible to determine the pixels of the upper side of the building structure and to determine the corresponding x,y position. However, if the height, i.e. z coordinate, of the earth surface with respect to the reference surface 3 is not known, a first terrain-induced error 6 will be introduced in the orthorectified image. Similarly, if also the height of the building structure is not known an additional building height-induced error 7 will be introduced in the final orthorectified image. In that case the upper side or the building structure can be projected meters aside the correct xy position in the orthorectified image. In case the building structure is a bridge, the road on the bridge will be projected erroneously if the elevation information with respect to the reference surface is not (accurately) known. FIG. 2 illustrates this type of error.

FIG. 2 shows an orthorectified image wherein a digital elevation model (DEM) is used to orthorectify the aerial image. A DEM, or "bare earth", which it is often referred to as, is created by digitally removing all of the cultural and bio-geographic features inherent to a digital surface model DSM by exposing the underlying terrain. A DSM is a first surface view of the earth containing both location and elevation information in a coordinate reference system. A DEM can be represented as a raster (a grid of squares), sets of iso-lines or contours, or as a triangular irregular mesh network. The USGS 10 m National Elevation Data Set (NED) is a cost-effective DEM available but fails to allow for accurate orthorectification for bridges, buildings and elevated structures as shown in FIG. 2. By not taking into account the height of the bridges, the upper sides of the bridges are shifted with respect to the real location of the bridges. The real location of the bridges in FIG. 2 are indicated by the white lines superimposed on the orthorectified image. FIG. 3 shows an orthorectified image wherein an accurately geo-coded DSM is used to orthorectify the aerial image. In can be seen that by using the correct heights of the building structures, the building structures are correctly projected on the orthorectified image space. The building structures are correctly projected when the white lines indicating the outlines of the building structures coincide with the visual outlines in the orthorectified image.

It should be noted that both DEMs and DSMs provides only a model of the earth surface. They do not comprise information which is easily recognizable on sensed images, maps and aerial photographs. Without GCP's associated with a DEM or DSM, they cannot be used to orthorectify such images. The accuracy of the GCP's used and the number of GCP's (count) and distribution/density across the image to be rectified will determine the accuracy of the resultant image or orthorectification process. The characteristic of the underlying elevation changes determines the required distribution/density of GCP's. For example a flat part of Kansas needs only some GCP's at the edges of the flat part. A small bridge over a little river doesn't need much. A giant bride over a massive ravine may need a high density to describe correctly the edges of the bridge. Likewise rolling hills will need more than a flat tilt.

Geographic Information Systems often combine both digital map information and orthorectified images in one view. Information from the image can be extracted or analyzed to add to, correct or validate the digital map information. Similarly, orthorectified images could be used to extract digital map information for use in a navigation device. In both situations it is important that the location of features in the orthorectified images correspond to their real locations on the earth. In the first case, due to incorrect heights, the position of road surfaces in the orthorectified image does not coincide with the corresponding road surfaces from the digital map. For an example see FIG. 2. In this case, the navigation device could measure positions that are different from those in its map database that were extracted from the poorly orthorectified image and could provide an alarm erroneously informing the user of the navigation device about unsafe driving conditions.

A requirement for generating a correct orthorectified image from an aerial image or satellite image is that sufficient GCP's are present within the area represented by the orthorectified image. Nowadays, the costs of orthorectification increase linearly with the amount of GCP's to be captured by humans. The more, GCP's are needed to obtain the required accuracy of an orthorectified image, the more human effort is needed.

There is a lack of cheap, accurate (with known accuracy) and well distributed ground control points to help control positionally accurate navigation and mapping applications. Furthermore, Advanced Driver Assistance Systems (ADAS) require accurate 3D positional information about the road to control such systems. This requires a very dense network of GCP's along the road surface to be able to rectify aerial or satellite imagery sufficient accurately. For these applications it is important that the road surface is correctly positioned in the orthorectified image. To be able to do this, elevation information is needed about the road surface, especially the elevation information of bridges, banks, elevated highways and flyovers.

The current state of ground control products for calibration and rectification of geospatial imagery is patchy and inconsistent in almost all areas of the globe. The following data sources exist for calibration and rectification of geospatial data:

a) DEM/DTM data derived from government topographic datasets. However, these data are frequently coarse and out of date. In addition they vary greatly in quality from region to region;

b) DEM/DTM derived from airborne/satellite radar platforms. These are expensive and often cover large swaths of area that may not be of interest to many commercial mapping entities. These still require positional calibration from an independent accurate source. Satellite platforms currently do not provide data that consistently meet the precision requirement for ADAS-level work;

c) High quality survey grade GPS ground control points. These are expensive on a per point basis and require special permission for acquisition in some countries. Furthermore, the opportunities for repeatability are minimal;

d) Low quality GPS ground control points (ad hoc/non-survey grade). These are often not photo-identifiable and may be subject to rapid obsolescence. Geodetic metadata may be inconsistent and ill-defined. Furthermore, the location of points is generally not well planned;

e) GPS "track lines" from vehicles. These are almost not photo-identifiable and do not provide an accuracy that is higher than carriageway width. First, they are difficult to correlate with other track lines and will give different positions based upon subtle driving patters especially at intersections, making correlating transportation nodes impossible;

f) Existing Aerial Image Products. These may be of utility for validating/rectifying lower quality output. But in production of Geospatial data, these are not suitable. In addition these suffer from a host of localized errors which are not easy to detect in 2D images; and g) Existing government or commercial centerline maps. These maps are abstract modeling specifications or centerline data. The accuracy profiles of such data sets are inconsistent and they lack quality elevation data.

There is need for a geodetic reference database product, that comprises sufficient GCP's or ground control information to orthorectify aerial or satellite imagery with enough accuracy in three dimensions to use the product as a reliable data source for GIS applications at least as it applies to the surface of roads.

SUMMARY OF THE INVENTION

The present invention seeks to provide an alternative method of generating a geodetic reference database product, that could be used in numerous GIS application such as: Image orthorectification, base mapping, location-based systems, 3D-visualisation, topographic mapping, vehicle navigation, intelligent vehicle systems, ADAS, flight simulation, in-cockpit situational awareness.

According to the invention, the method comprises:

acquiring mobile mapping data captured by means of digital cameras, range sensors and position determination means including GPS and IMU mounted to a vehicle driving across the earth surface, the mobile mapping data comprising simultaneously captured image data, range data and associated position data in a geographic coordinate system;

determining linear stationary earth surface features from the mobile mapping data by processing the image data, range data and associated position data;

generating 3D-models for the linear stationary earth surface features in the geographic coordinate system from the image data, range data and associated position data;

storing the 3D-models in a database to obtain the geodetic reference database product.

The invention is based on the recognition that to accurately orthorectify sensed aerial and satellite images a positionally accurate 3D model of the earth surface is needed. Furthermore, the relation of the sensed image and the 3D model has to be determined. Current 3D models such as DSM and DEM describe the earth surface in terms of 3D coordinates. These 3D coordinates do not have an associated color value corresponding to the earth surface when viewed from above. Therefore, it is not possible to align the 3D models and the sensed images. Furthermore, the pixel size of commercially available images is 5.0 m with a horizontal accuracy RSME of 2.0 m and a vertical accuracy RMSE of 1.0 m. These resolutions and accuracies limit orthorectification processes from generating orthorectified images with a higher accuracy.

Mobile mapping vehicles capture mobile mapping data captured by means of digital cameras, range sensors, such as laser/radar sensors, and position determination means including GPS and IMU mounted to a vehicle driving across the road based earth surface, the mobile mapping data comprising simultaneously captured image data, laser/radar data and associated position data in a geographic coordinate system. Position determining means enables us to determine the position with a horizontal absolute accuracy of 50 cm and a vertical accuracy of 1.5 m. By means of the laser/radar sensor in combination with the determined associated position data, it is possible to create a surface model with a relative horizontal accuracy of 50 cm for 100 m and a relative vertical accuracy of 35 cm for 100 m. With better hardware, i.e. faster range sensor providing a denser laser cloud an accuracy of 1 cm is achievable.

From the images of the mobile mapping data, linear stationary earth surface features can be determined. A linear stationary earth surface feature could be a road segment, the upper side of a bridge, an overpass, etc. A characteristic of a linear stationary earth surface feature according to the present invention is that is has visually detectable edges and a smooth surface, i.e. a surface without discontinuities such that the surface can be approximated by a planar surface between the edges. This enables us to use a 3D-model which describes the linear earth surface feature by means of two poly lines which correspond to the left and right side of the planar surface of the earth surface feature.

The surface model could be used to transform the image data into orthorectified images of the earth surface with a pixel size of 2 cm, a relative horizontal accuracy of 50 cm for 100 m. The height information from the surface model could be added to each pixel of the orthorectified image to obtain a 3D orthorectified image having a relative vertical accuracy of 35 cm for 100 m. From the image data, linear stationary earth surface features or Ground Control Objects GCO, such as road surfaces, could be extracted and stored as 3D-models in a database for orthorectification of imagery. A characteristic of the 3D-model of a stationary earth surface feature is that it has a shape and size that it could be recognized and identified in the imagery to be rectified.

Another advantage of the 3D surface models according to the invention is, that the 3D model defines both the surface and the edges. The edges are useful to improve the quality of existing DTM's and DSM's. Use of the edges allows for the placement of cut lines or break lines in the surface model at positions not restricted to the typical grid pattern of the DEM. In surface models it is not clear how four neighboring survey points should be triangulated, to provide the best approximation of reality. There are two possible results to triangulate the four points, each possibility defining a different surface. Delaunay triangulations will select the result in which the minimum angle of all the angles of the triangles in the triangulation is maximized. However, this result would not necessarily be the best result to represent the surface in reality. The 3D models of the linear stationary earth surface features according to the invention, i.e. the edges could be used as break lines to control the triangulation, i.e. to select the result of triangulation of four survey points that approximated best reality. The 3D models could also be used as additional survey points in existing DTM's or DSM's to improve the quality and reliability when using such a surface model in a GIS application or when using the surface model for rectification of aerial imagery.

As the positional information of the 3D-model in a coordinate reference system is accurately known, the corresponding part of the image could be rectified accurately. The present invention enables us to generate a huge amount of 3D-models that could be used as GCO's in an easy way and short time period. An advantage of 3D-models over a database with GCP's is that a 3D-model models a part of earth surface, whereas a GCP refers to only one XYZ-coordinate. When using a database with GCP's, the elevation information of locations between GCP's has to be estimated, which could result in mapping inaccuracies. The method helps us to capture 3D-models of the earth surface. These point objects could only be collected manually by humans using standard survey methods for measuring and modeling the earths surface thereby correcting errors as shown in FIG. 2.

The method according to the invention combines the best of three worlds, accurate position determination, processing of high resolution laser/radar or terrestrial lidar data and processing of high resolution images. Both the laser/radar data and image data have a high resolution and accuracy as they represent data captured at relative short distance to the recorded surface compared to aerial imagery. This allows us to use less expensive digital cameras and laser sensors.

A linear stationary earth surface feature could be any physical and visual linear feature in the earth's surface selected from a group comprising at least one of: road surface of road segments, waterways, any physical feature having well defined edges such as overpasses, bridges, baseline of building structures for which a 3D model can be derived from the mobile mapping data and which is photo-identifiable in an aerial or satellite imagery.

In a further embodiment the 3D-models, which correspond to road segments are linked to obtain a continuous linear control network; and storing the continuous linear geographic network in the geodetic reference database product. The continuous linear control network, provides us a continuous and seamless 3D-model of the earth surface which allows us to rectify accurately the image areas corresponding to the road segments. As the road network extends along most parts of the world, by means of this invention, it is possible to generate an accurate road elevation model that could be used to rectify more accurately aerial and satellite imagery of almost any part of the world. In particular, by means of the continuous linear control network, it is possible to significantly improve the orthorectification of the roads in the imagery. The continuous linear control network provides a very accurate DEM or DSM of the surface of the roads and road structures with a resolution which is up to 5 times better than commercially available DSMs or DEMs.

In an embodiment, a linear stationary earth surface feature corresponds to a linear characteristic of a road segment selected from a group of features comprising: road centerline, left road edge, right road edge, road width. These features are used to describe the 3D-model. The 3D-model could be the road centerline, left road edge or right road edge, which can optionally be combination with the road width. A 3D-model describing the road surface could be based on the left road edge and right road edge. The 3D-model describes a shape of the road that could be identified in an aerial or satellite images. Preferably, the 3D model corresponds to road edges and linear paintings which are identifiable in images. The coordinates associated with the 3D model can be used to rectify the image. Furthermore, if the 3D-model describes accurately the surface, i.e. elevation deviations, the area in the image corresponding the 3D-model can be rectified very accurately. Furthermore, the 3D model could be used for DTM refinement/improvement.

In an embodiment of the invention, the determining linear stationary earth surface features process comprises detecting a road surface in the image data, extracting the position of the road surface edges and associated with it linear paintings in the geographic coordinate system by combining the image data, range data and associated position data and calculating the linear stationary earth surface feature from the position of the road surface. The 3D-model could be based on vectors describing the dimensions and position of the linear stationary earth surface feature in the coordinate reference system. This is an efficient method for describing spatial structures.

In an embodiment, the method further comprises:
generating orthorectified images for the 3D-models by combining image data and range data,
determining elevation information in the geographic coordinate system for each pixels of the orthorectified images;
linking the orthorectified images and the elevation information to obtain 3D-orthorectified images; and
storing the 3D-orthorectified images and linking the images to respective 3D-models in the geodetic database product. These features enables us to enhance the 3D-models with visible characteristics of the earth surface of the 3D-model. The characteristics provide additional accurate ground control information related to specific points in the area of a 3D-model. The visible characteristics are also stationary earth surface features. Examples of stationary earth surface feature or a road segment are: road markings such as "Warning of 'Give Way' just ahead,", Stop lines, guidance arrows, pedestrian crossings, tapered road edge lines at highway exits, hatched markings, chevron markings, etc. These road markings can be used as additional ground control information which can be used to detect the corresponding road markings in images to be rectified. For example a long straight road segment represented by a 3D-model provides without 3D orthorectified images position information about the beginning, ending and trajectory of the road segment. As the road is straight, the 3D-model does not provide sufficient ground control information along the road segment to verify a position of pixels along the road segment in the image to be rectified. The 3D orthorectified images, visualizing the road surface and/or road markings, enables the rectification process to match photo-identifiable objects from both sources and to use the position information associated with the 3D orthorectified images to map the corresponding area of the image on the orthorectified imagery. Further more, the 3D orthorectified images enable us to have a network of well distributed ground control points, by means of images of the road markings, to positionally improve the accuracy of navigation and mapping applications. In this embodiment, a 3D-model could include one image representing the colors of the whole orthorectified surface area of the 3D model, a mosaic of orthorectified images, or a set of smaller orthorectified images representing photo-identifiable objects along the model.

It is further an object of the invention to provide a method which enables a computer implemented system to generate content to be stored in a ground control database.

It is yet a further object of the invention to provide a method of correcting geographical coordinates of a digital elevation model.

It is further an object of the invention to provide a method of rectifying an aerial or satellite image, wherein the method comprises
acquiring an aerial or satellite image;
acquiring a geodetic reference database product comprising 3D-models;
retrieving one or more 3D-models and corresponding coordinates from the geodetic reference database;
finding locations in the image where the one or more 3D-models match with the aerial or satellite image; and
using the position of the 3D-models in the coordinate reference system to rectify the aerial or satellite image. As 3D-models of, for example, road segments describe the earth surface in more detail and larger extend than a set of ground control points, they enable us to improve the rectification process. The method could also be used to validate orthorectified aerial or satellite images and rectify, i.e. correct, image parts that match but have different coordinates in the coordinate reference system.

SHORT DESCRIPTION OF DRAWINGS

The present invention will be discussed in more detail below, using a number of exemplary embodiments, with reference to the attached drawings, in which FIG. 1 shows schematically a source of distortion in the orthorectification process;

DETAILED DESCRIPTION OF EXEMPLARY EMBODIMENTS

Figure 1:
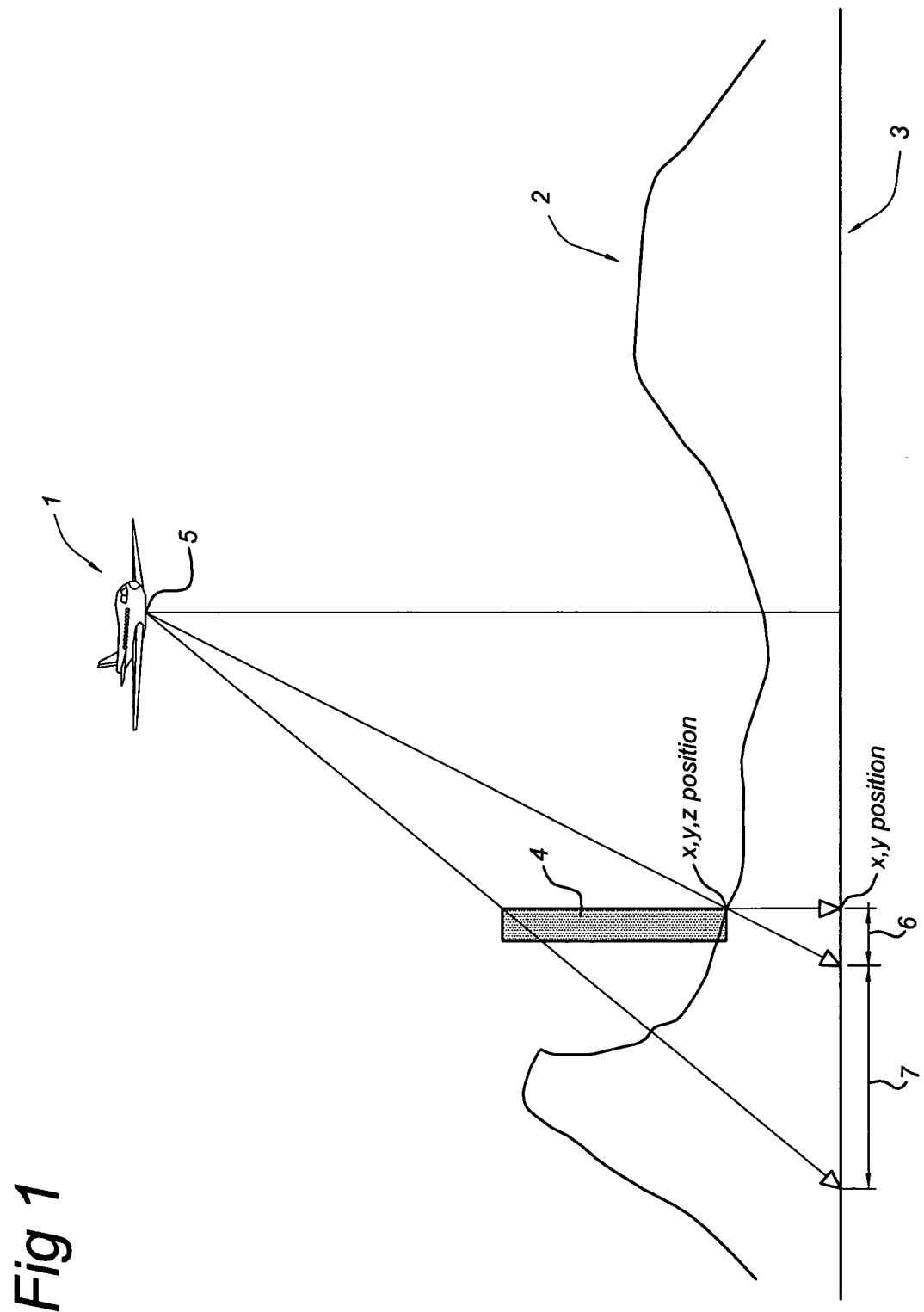
Figure 2:
FIG. 2 shows an orthorectified image with use of a DEM.
Figure 3:
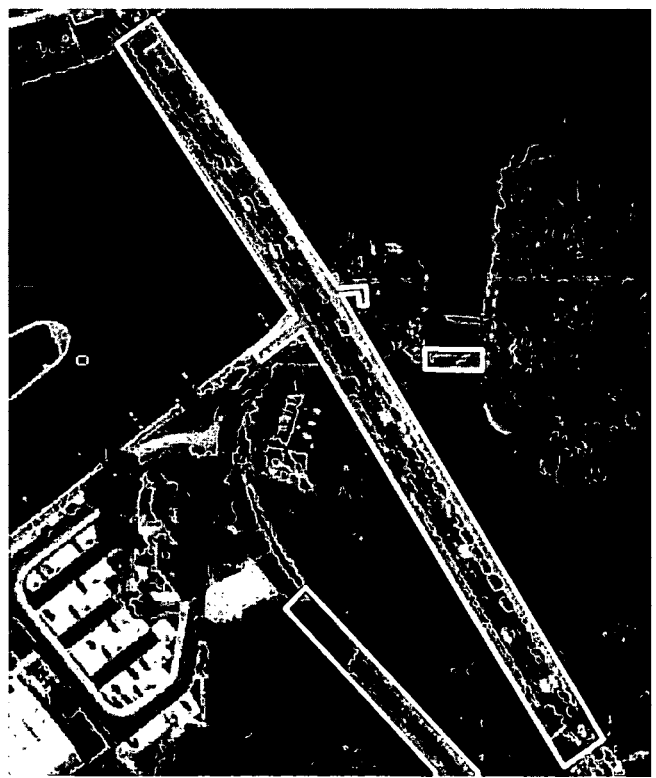
FIG. 3 shows an orthorectified image with use of a DSM.
Figure 4:
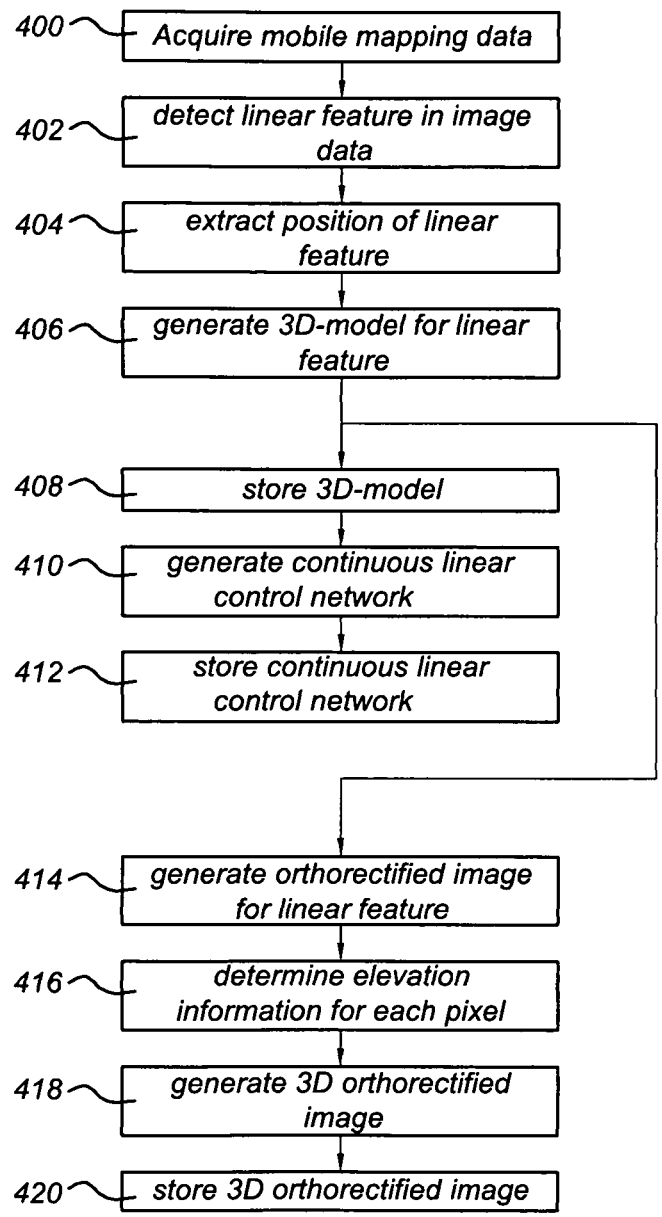
FIG. 4 shows a flow diagram of the method according to the invention.

FIG. 4 shows a simplified flow diagram of the method according to the invention. The method starts with action 400, by acquiring mobile mapping data. Mobile mapping data is captured by means of digital cameras, laser sensors, for example a laser scanner, and position determination means including GPS and IMU mounted to a vehicle driving across the earth surface, the mobile mapping data comprising simultaneously captured image data, laser data and associated position data in a geographic coordinate system. A vehicle provided with position determination means, laser sensors and digital cameras for collecting mobile mapping data is called a mobile mapping system MMS. A position determination means is at least arranged to determine the position of the vehicle in a coordinate reference system and optionally with the orientation of the vehicle. It should be noted that in stead of laser sensors any other range sensor, such as a LADAR, LIDAR and RADAR, could be used to capture data that can be used to generate a 3D model or 3D image. In principle any image data and range data could be used as long the data includes accurate associated position and orientation data in 6 degrees of freedom.

Figure 6:
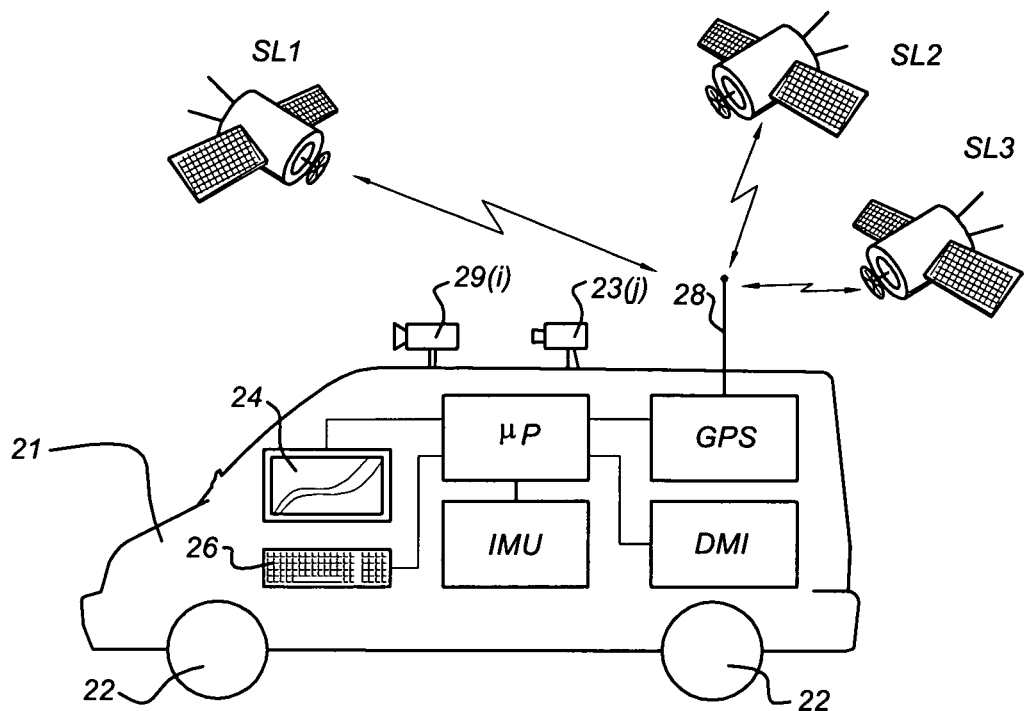
FIG. 6 shows a MMS system with a camera and a laser scanner.

FIG. 6 shows a MMS system that takes the form of a car 20. The car 20 is provided with one or more cameras 29($i$), i=1, 2, 3, . . . I and one or more laser scanners 23($j$), j=1, 2, 3, . . . J. The looking angle of the one or more cameras 29($i$) can be in any direction with respect to the driving direction of the car 21 and can thus be a front looking camera, a side looking camera or rear looking camera, etc. The viewing window(s) of the camera(s) 29($i$) cover(s) the whole road surface in front the vehicle. Preferably, the angle between the driving direction of the car 21 and the looking angle of a camera is within the range of −45 degree-+45 degree on either side. The car 21 can be driven by a driver along roads of interest.

The car 21 is provided with a plurality of wheels 22. Moreover, the car 21 is provided with a high accuracy position determination device. As shown in FIG. 6, the position determination device comprises the following components:

- a GPS (global positioning system) unit connected to an antenna 28 and arranged to communicate with a plurality of satellites SLi (i=1, 2, 3, . . . ) and to calculate a position signal from signals received from the satellites SLi. The GPS unit is connected to a microprocessor μP. Based on the signals received from the GPS unit, the microprocessor μP may determine suitable display signals to be displayed on a monitor 24 in the car 1, informing the driver where the car is located and possibly in what direction it is traveling. Instead of a GPS unit a differential GPS unit could be used. Differential Global Positioning System (DGPS) is an enhancement to Global Positioning System (GPS) that uses a network of fixed ground based reference stations to broadcast the difference between the positions indicated by the satellite systems and the known fixed positions. These stations broadcast the difference between the measured satellite pseudoranges and actual (internally computed) pseudoranges, and receiver stations may correct their pseudoranges by the same amount.
- a DMI (Distance Measurement Instrument). This instrument is an odometer that measures a distance traveled by the car 21 by sensing the number of rotations of one or more of the wheels 22. The DMI is also connected to the microprocessor μP to allow the microprocessor μP to take the distance as measured by the DMI into account while calculating the display signal from the output signal from the GPS unit.
- an IMU (Inertial Measurement Unit). Such an IMU can be implemented as three gyro units arranged to measure rotational accelerations and translational accelerations along three orthogonal directions. The IMU is also connected to the microprocessor μP to allow the microprocessor μP to take the measurements by the DMI into account while calculating the display signal from the output signal from the GPS unit. The IMU could also comprise dead reckoning sensors.

It will be noted that one skilled in the art can find many combinations of Global Navigation Satellite systems and on-board inertial and dead reckoning systems to provide an accurate location and orientation of the vehicle and hence the equipment (which are mounted with know positions and orientations with references to a reference position and orientation of the vehicle).

The system as shown in FIG. 21 is a so-called "mobile mapping system" which collects geographic data, for instance by taking pictures with one or more camera(s) 29($i$) mounted on the car 21. The camera(s) 29($i$) are connected to the microprocessor μP. The camera(s) 29($i$) in front of the car could be a stereoscopic camera. The camera(s) could be arranged to generate an image sequence wherein the images have been captured with a predefined frame rate. In an exemplary embodiment one or more of the camera(s) are still picture cameras arranged to capture a picture every predefined displacement of the car 21 or every interval of time. The camera(s) 29($i$) send the images to the μP. In an embodiment, the mobile mapping vehicle comprises three cameras, one front looking camera and a camera at each side having a looking axis within a range of 30-60 degree and preferably 45 degree, with respect to the heading direction of the vehicle. In that case, the front looking camera captures images especially suitable for detecting road directions above the road surface and the side looking cameras captures images especially suitable for detecting objects, such as road signs, along the road.

Moreover, the laser scanners $23(j)$ take laser samples while the car 21 is driving along roads of interest. The laser samples, thus, comprise data relating to the environment associated with these roads of interest, and may include data relating to the road surface, building blocks, trees, traffic signs, parked cars, people, direction signposts, the road side etc. The laser scanners $23(j)$ are also connected to the microprocessor μP and send these laser samples to the microprocessor μP.

It is a general desire to provide as accurate as possible location and orientation measurement from the three measurement units: GPS, IMU and DMI. These location and orientation data are measured while the camera(s) $29(i)$ take pictures and the laser scanners $23(j)$ take laser samples. Both the pictures and laser samples are stored for later use in a suitable memory of the μP in association with corresponding location and orientation data of the car 21, collected at the same time these pictures were taken. The pictures include visual information, for instance, as to the road surface, building blocks, to trees, traffic signs, parked cars, people, direction signposts, monuments, etc. The laser scanners $23(j)$ provide a cloud of laser scanner points dense enough to visualize in a 3D representation of along the road information. In an embodiment, the laser scanner(s) $23(j)$ are arranged to produce an output with minimal 35 Hz and 1 deg resolution in order to produce a dense enough output for the method. A laser scanner such as MODEL LMS291-S05 produced by SICK is capable of producing such output. The minimal configuration of laser scanners is to have one laser scanner looking down a head or after the car 21 sensing the road surface the car is driving on. An optimum configuration is to have one or two laser scanners scanning the area at the left or right side of the car 21 and one laser scanner looking down after or ahead the car 21. The latter one has a rotation scanning axis parallel to the driving direction of the car 21. The other laser scanners having a rotation axis with 45 degree angle to driving direction of car 21. Unpublished International Application PCT/NL2007/050541 discloses further advantages of using a set-up wherein two laser scanners scan the same surface at different time instants. It should be noted that in stead of laser scanners any other range sensor could be used that provides distance information or a dense point cloud.

Figure 7:
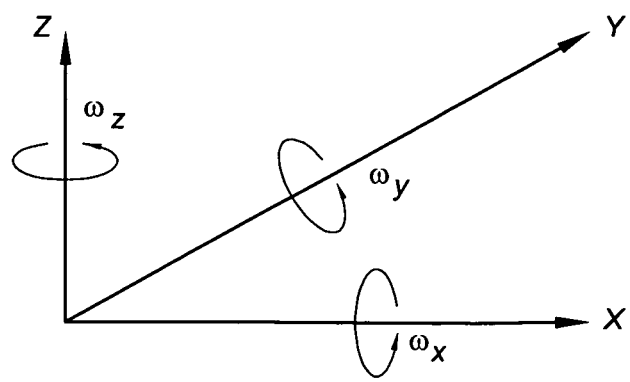
FIG. 7 shows a diagram of location and orientation parameters.

FIG. 7 shows which position signals can be obtained from the three measurement units GPS, DMI and IMU shown in FIG. 6. FIG. 7 shows that the microprocessor μP is arranged to calculate six different parameters, i.e., three distance parameters x, y, z relative to an origin in a predetermined coordinate system and three angle parameters $\omega_x$, $\omega_y$, and $\omega_z$, respectively, which denote a rotation about the x-axis, y-axis and z-axis respectively. Preferably, the z-direction coincides with the direction of the gravity vector. The global UTM or WGS84 coordinate system could be used as predetermined coordinate reference system. It should be noted that the method according to the invention can be used with a local coordinate reference system, such as NAD 83 and other national grid systems. The six different parameters provide the 6-(x, y, elevation, heading, roll, pitch) positioning and orientation of MMS platform which is needed to track the position and orientation of the vehicle in time. The camera(s) and laser scanners have a fixed position and orientation with respect to the car 21. This enables us to determine accurately from the six parameters the position of each laser sample in the coordinate reference system and the position and orientation of the camera in the coordinate reference system at the moment of taking an image or laser sample.

In action 402, a linear earth surface feature is detected in the image data. A linear stationary earth surface feature could be any physical and visual linear feature in the earth's surface for example: the road surface edges of road segments, any physical feature having well defined visual edges between two areas and any other earth surface feature for which a 3D model can be derived from the mobile mapping data and which is photo-identifiable in an aerial or satellite imagery.

In action 404, the position in the coordinate reference system of the selected linear stationary earth surface feature is extracted from the image data, laser data and position data of the MMS data. In action 406, a 3D-model is generated for the selected linear earth surface feature and in action 408, the 3D-model is stored in a geodetic reference database product.

There are many implementations possible to implement the actions 402, 404 and 406. A person skilled in the art, will know suitable methods and algorithms to perform the corresponding actions. An approach can be the individual processing of images from the MMS data and extracting the 3D position information of the feature by combining the image data, laser data and position data. If the same linear feature extends more than one image, the 3D position information of the corresponding images have to be combined to model the linear feature.

According to the present invention, the images from the MMS data are processed to obtain orthorectified mosaics. An orthorectified mosaic visualizes an orthorectified view of the earth surface along a part of the track line of the mobile mapping system. In most cases they represent the road surface, pavement and a part of the road side along the road. To capture watersides defined by building structures such as quays and dikes, the mobile mapping system could be a boat navigating waterways.

International Application WO08044927 discloses a method to generate orthorectified tiles and mosaics from Mobile Mapping Images. The images are projected on a virtual plane representative of the road surface ahead the mobile mapping vehicle. The real surface model of the road surface can easily be derived from the laser data. A skilled person can adapt easily the method disclosed in WO08044927 to project the images on the real surface model obtained by processing the range data, instead of the virtual plane to produce the orthorectified images. As the position of the real surface model is known, next to the XY position in the geographic reference system, the elevation information for each pixel can also easily be derived from the image data and laser data and linked to the orthorectified mosaic. It should be noted that in the present application with orthorectified image is meant an image comprising meta data defining for each pixel the xy-coordinate in a coordinate reference system. The xy-coordinate is a position on the geoid defining the 3D-model of the earth. Furthermore, each pixel value is regarded to represent the earth surface, i.e. of the earth surface model, as seen perpendicular to the orientation of the earth surface at the xy-position.

The elevation information defines the height difference between the height of a xy-position of the "real world" surface and the height assumed by the geoid defining the 3D model of the earth in said xy-position.

The thus obtained orthorectified images are very suitable to detect linear features such as road segments and to extract the position in the coordinate reference system of said linear features. From the orthorectified images a linear referenced image could be generated. A linear reference image is an image wherein a specific column corresponds to the track line of a mobile mapping vehicle and each row of pixels represents the earth surface along a line perpendicular to the track line.

Unpublished International application PCT/NL2007/050477 discloses a method to generate linear referenced images from mobile mapping data. In linear reference images, curved roads are visualized as straight roads. For straight roads, it is less difficult to determine characteristics of a road segment such as centerline, left road edge, right road edge, road width and linear road markings. Unpublished international application PCT/NL2007/050159 discloses a system and method for producing road width & centerline data from orthorectified images and is suitable to be used. Unpublished international application PCT/NL2007/050569 discloses a system and method for producing linear lane information data from images wherein the road has a known orientation in the image. Said application allows us to detect accurately linear road markings in linear referenced images.

The previous paragraph makes clear that methods are available to detect linear features from mobile mapping data, to determine the corresponding position in the images and to calculate the corresponding XY-position in a coordinate reference system. In combination with the linked elevation information, a 3D-model of the linear feature can easily be generated. Preferably the 3D-model is a vector-based model.

Figure 9:
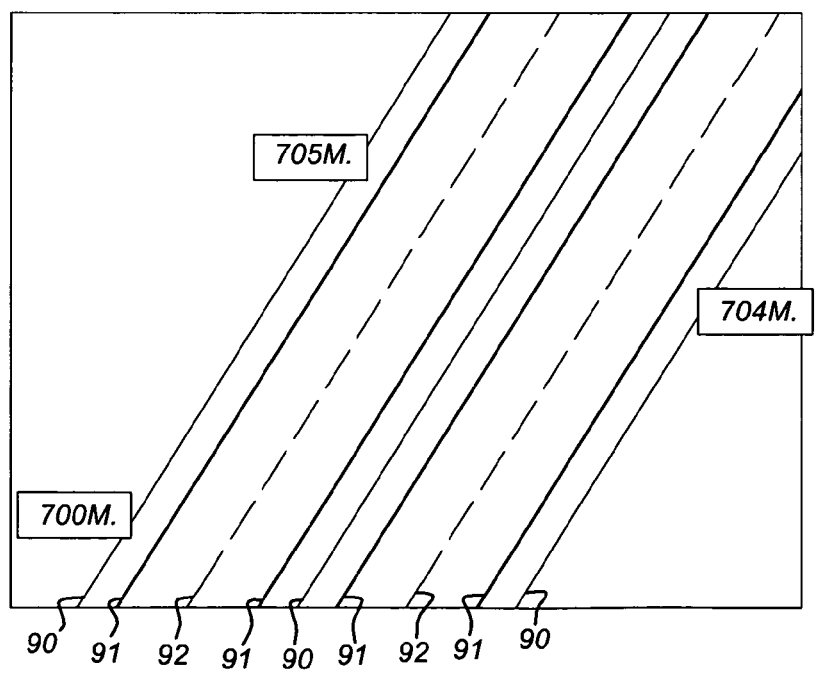
FIG. 9 illustrates road characteristics to model linear stationary road surface features.

A road segment can be modeled in different ways. FIG. 9 shows some examples. The 3D-model could describe the road segment in terms of road centerline 92, pave edges 90, legal edges 91, i.e. left and right edge of carriageway lines or any combination of them. It should be noted that the road centerline could be the middle point between road edges or the road painting indicating the road centerline. When using the 3D model in an application, one should know which definition is used. In an embodiment, the linear features are described by means of polylines. In computer graphics, a polyline is a continuous line composed of one or more line segments. A polyline is specified by the endpoints of each line segment. In an embodiment, one polyline is used to describe a road segment. Additionally, the road width and slope perpendicular to the direction of the road segment in the x,y plane could be added to describe the size/width and shape of the road surface. In another embodiment, a road segment is described by two polylines corresponding to the paved edges. Additionally, a polyline corresponding to the road centerline could be added. The shape of the road surface of a road segment could be defined by the soft rounded surface through any of the used lines describing the road centerline, paved edge or edge lines describing road segment. In general, the road surface can be approximated by the shortest lines between two polylines, for example the left and right edge line.

Figure 8:
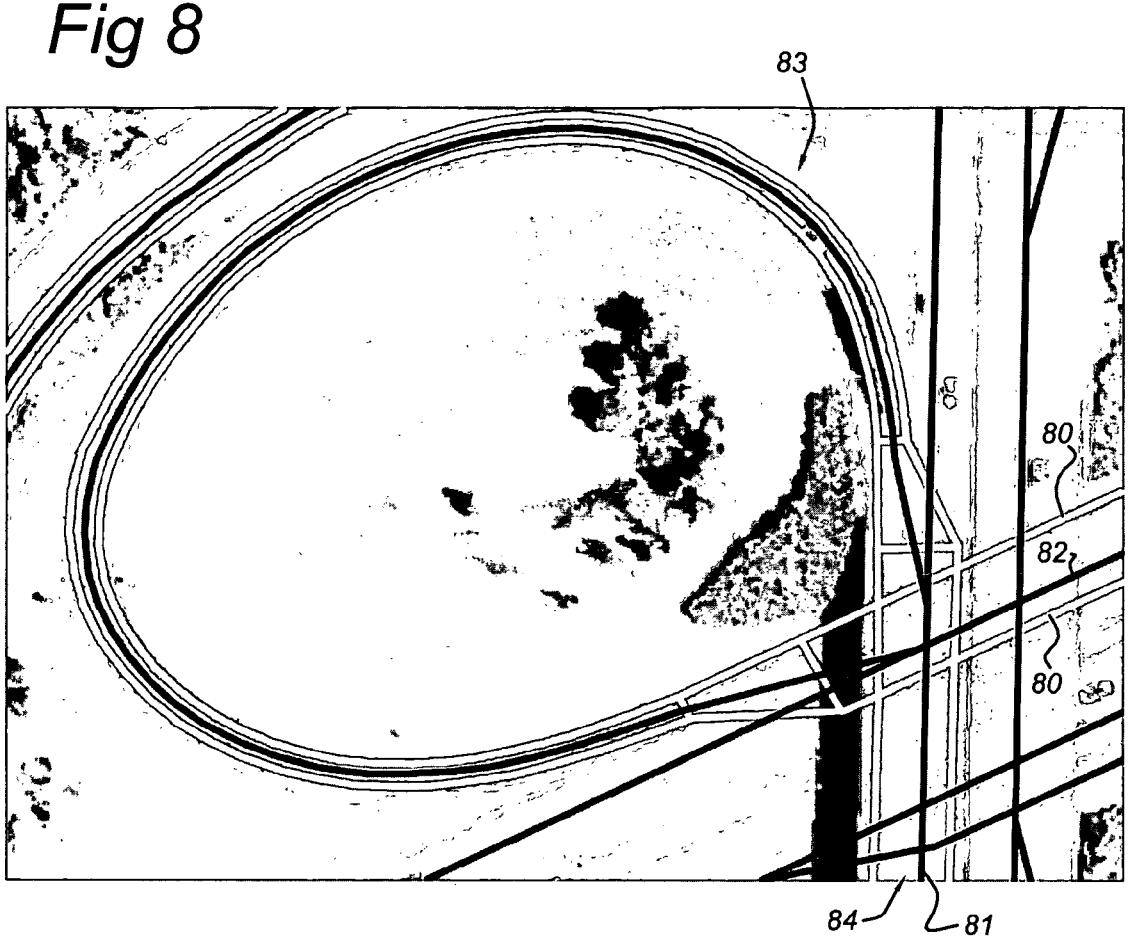
FIG. 8 illustrates examples of linear stationary road surface features.

FIG. 8 shows by way of example the lines corresponding to the road centerline 81 and edge lines 80. Furthermore FIG. 8 shows a first road segment 82, a second road segment 83 and a third road segment 84. The first road segment 82 corresponds to the last part of a road segment of a high way up to an exit. The second road segment 83 corresponds to the interconnection between two high ways and the third road segment 84 corresponds to the beginning of another high way segment. As the 3D models comprises elevation information, the first road segment 82 will be below the third road segment 84 and the second road segment 83 will gradually change height from the level of the first road segment 82 to the level of the third road segment 84. This is valuable information to rectify correctly aircraft or satellite imagery. Furthermore, the slope and curvature of the second road segment provides important information for ADAS applications.

The 3D-model could also describe the surface of the road surface between edge lines by means of a DSM that is derived from the laser data. This DSM will have a much denser grid of laser point than current DSMs or DEMs derived from airborne or satellite platforms. The thus obtained DSM could be used to enrich locally the DSM/DEM's from airborne or satellite platforms with more accurate and dense elevation information.

In the database are stored the 3D-models of road segments. In action 410, the 3D-models of road segments are linked together to form a continuous control network. The nodes of the network correspond to junctions and the branches of the network correspond to road segments between junctions or connected to junctions. In action 412 the continuous linear control network is stored in the geographic reference database. The network provides a means to extract easily a DSM of the road surface of a region from the database. A characteristic of the network is that the road segments touches in a junction from a continuous and seamless DSM of the road network. This can be assured as the road segments are derived from the same data source namely the same mobile mapping session.

Primarily, the image data is used to determine the location of road surfaces first in the image and by combining location in the images with the laser data, the position of the road surface in a coordinate reference system. However, the image data can further be used to enhance the 3D-model with the "real world" appearance of the road surface, showing road markings, texture and color of the road surface, pavement type, shoulder, etc. Furthermore, these markings can form a dense array of GCP's to enable complete positioning and/or rectification of a road segment. In action 414, an orthorectified image is generated for a linear feature. As describe above, in action 402-406, an orthorectified image or mosaic of the road surface is already made. Therefore action 414 can be limited to select the corresponding areas or pixels of the orthorectified images to compose the orthorectified image for a 3D-model. Optionally, in action 416, elevation information is associated with each pixel of the orthorectified image for a 3D-model. If the linear feature is a road segment, the road surface can be approximated by a planar surface between the edge lines. The elevation information can be derived by means of interpolation techniques between the edge lines. In action 418 by linking orthorectified image and the elevation information a 3D orthorectified image is generated. In action 420, the 3D-orthorectified image is stored in the geographic reference database together with a link to the corresponding 3D-model.

Therefore, in an embodiment, a 3D-model comprises further an orthorectified image of the corresponding road segment described by the polylines. The orthorectified image can be derived accurately from the image data, range data and position/orientation data. The orthorectified image created from the process described above can be used as a reference image to improve the process of rectifying aerial or satellite images and even to correct/improve rectified aerial or satellite images. The road paintings, such as road centerline, dashed lines, stop lines can be used to find a match in the image to be rectified/corrected. This will provide additional ground control points to rectify/correct the image along the road segment. The laser data could further be used to assign elevation information to each pixel of the orthorectified image associated with a 3D-model. The elevation information could be used to transform the orthorectified image in an image which corresponds to the view as seen from the position from which the image to be rectified is captured. This improves the accuracy of the matching process in the rectification process and reduces the chance of erroneous matches.

It should be noted that the size of a 3D orthorectified image, which includes elevation information should not be limited to the area of the surface of the road. It may represent an orthorectified view of all the earth surface in the road corridor that can be derived from the image data and range data.

Figure 10:
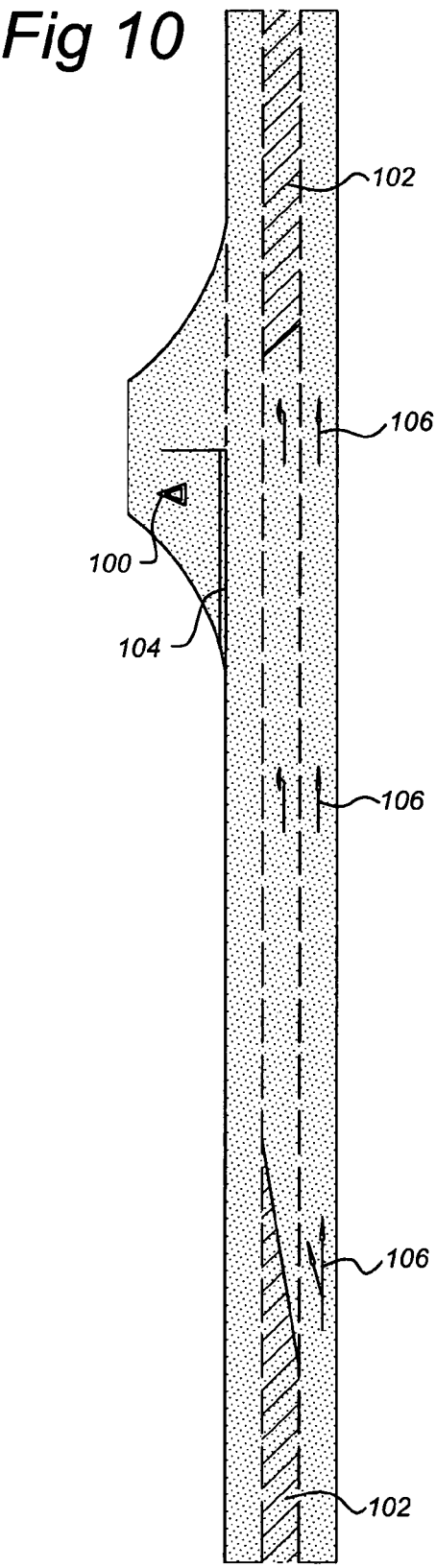
FIG. 10 shows examples of additional ground control information.

It should be noted that instead of one 3D-orthorectified image for a road segment, image chips could be generated. An image chip is a representation of a stationary earth surface feature. Examples of stationary road surface features are: a stop line, "Warning of 'Give Way' just ahead", guidance arrows, sewer grates, speed limits, pedestrian crossings, tapered road edge lines at exits, sharp curb edges, metal caps for man-hole covers and any other direction indications 90 of FIG. 9. Other road surface features are hatched markings or chevron markings, reflection arrows, bifurcation arrows. Traffic Signs Manual 2003, Chapter 5, Road Markings, ISBN 0 11 552479 7, provides an overview of road markings that can be used. FIG. 10 illustrates "Warning of 'Give Way' just ahead" 100, hatched markings 102, stop line 104 and direction indications 106. Furthermore, any other road painting, stark changes in pavement type, monument bases, unique low-lying geological features could be used to generate an image chip.

An image chip comprises a snapshot image of the stationary earth surface feature taken from an orthorectified image and metadata representative of the XY position in the coordinate reference system and elevation of height information. At least one pixel of an image chip must have association position information to define the position of the image chip in the coordinate reference system. This could be a relative position with respect to the associated 3D-model. Optionally, the image chip could have a reference to the original orthorectified image or tile or image of the mobile mapping session to allow manual verification of the image chip. Each pixel of an image chip could comprise associated elevation information in the coordinate reference system. Then the image chip is also a 3D-orthorectified image. The size of an image chip depends on the size of the stationary road surface feature and the pixel size. A pixel represents preferably an area of 3-15 by 3-15 cm, has an absolute horizontal resolution higher than 50 cm and absolute vertical resolution higher than 1.5 m in a coordinate reference system. The resolution in the database product depends on the accuracy/resolution of the image data, range data and position/orientation data and the application for which the database product is intended.

The image chips are provided with a link to the corresponding 3D-model and stored in the geodetic reference database. The image chips can be used as GCP's to be found in aerial or satellite imagery and to direct process of finding a matching location for a 3D-model in aerial or satellite imagery.

The method according to the invention generates a geodetic reference database product from data that has been captured by means of a relatively inexpensive vehicle which could be provided with relatively inexpensive digital cameras, laser sensors and position determining means. The method creates a photo-identifiable data set that can be used as ground control objects in orthorectification processes. The invention allows us for high volume collection of ground control objects and GCP's which is orders of magnitude greater than traditional ground control production. The method has a consistent and verifiable accuracy profile in all geodetic dimensions. The method does not need special photo-identifiable earth surface marks to be first created in the field in order to be used to orthorectify future aerial imagery. Furthermore, the database product comprises substantially photo-identifiable material that will exist for many years. As the database product comprises 3D information, it can be used to correct 3D surface models as well.

Another advantage of the usage of MMS data is that in one mobile mapping session, the images data as well as the laser data records areas of the earth surface more than once when crossing a junction or traveling a road segment more than once. These areas could comprise a stationary road surface feature that can be used as a ground control object. In reality, the stationary road surface feature has the same location in the coordinate reference system. However, the positioning determining could have some absolute and relative inaccuracy within one mobile mapping session. The method according to the invention will select these linear stationary road surface features two or more times and corresponding XY position and elevation information Z-coordinate will be determined each time. For each determined linear stationary road surface feature a record could be made in the database comprising a 3D-model and metadata describing the XYZ position and optionally a reference to the original orthorectified image. By analyzing records related to the same linear earth surface feature, redundant information can be removed from the database. For example, by combining, i.e. averaging, or anomaly exclusion, the images and metadata of the same linear stationary road surface features, redundant information can be removed. By averaging the XY position and elevation information, meta data with averaged values for the XYZ coordinates could be calculated for a 3D-model. Averaged values will, in general, more accurately define the position of the 3D-model in the coordinate reference system.

Figure 5:
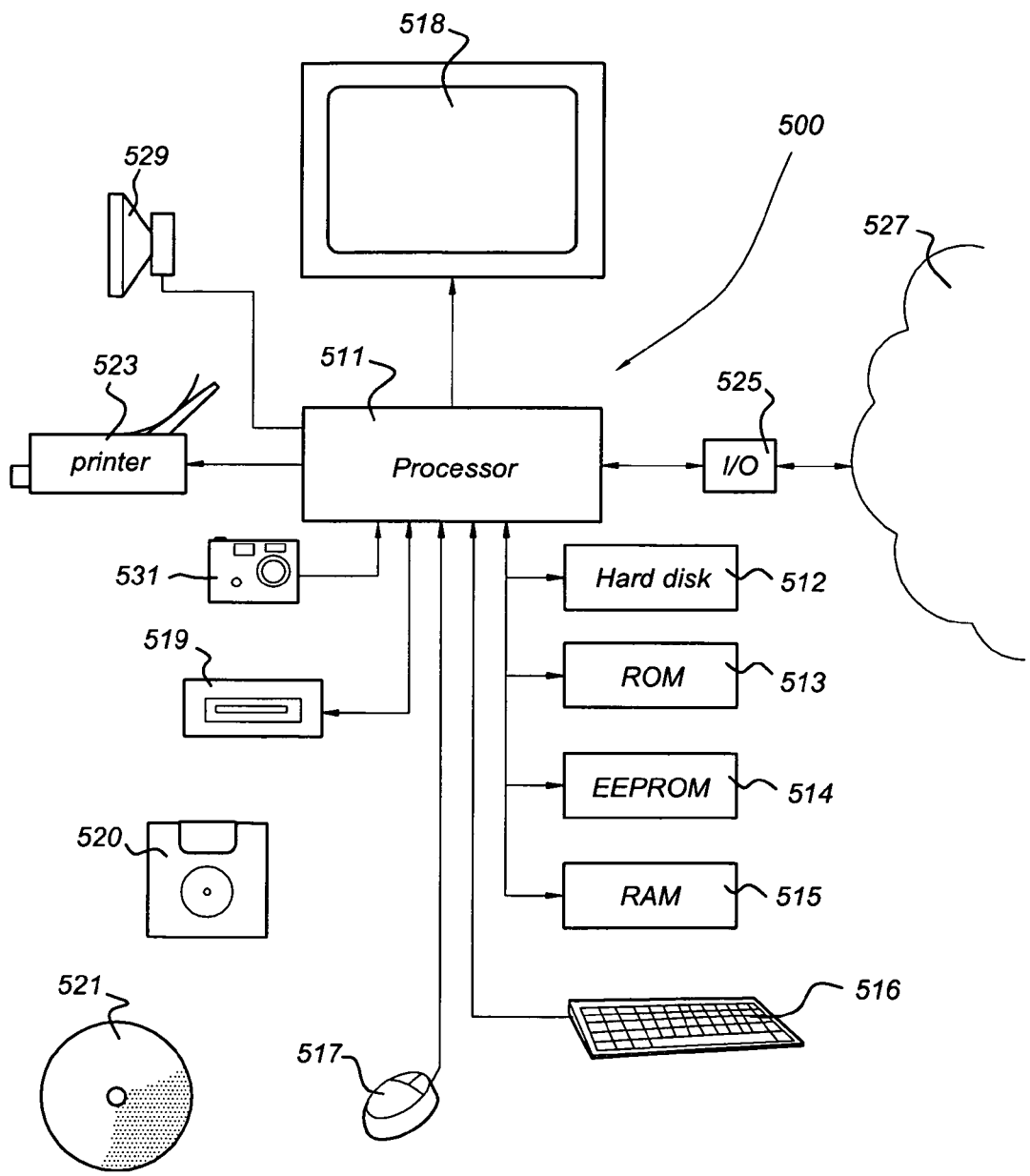
FIG. 5 is a block diagram of an exemplar computer system for implementing the methods according to the invention.

In FIG. 5, an overview is given of a computer arrangement 500 suitable for implementing the present invention. The computer arrangement 500 comprises a processor 511 for carrying out arithmetic operations. The processor 511 is connected to a plurality of memory components, including a hard disk 512, Read Only Memory (ROM) 513, Electrical Erasable Programmable Read Only Memory (EEPROM) 514, and Random Access Memory (RAM) 515. The memory components comprises a computer program comprising data, i.e. instructions arranged to allow the processor 511 to perform the method for generating a spatial-data-change message or the method for processing a spatial-data-change message according to the invention. Not all of these memory types need necessarily be provided. Moreover, these memory components need not be located physically close to the processor 511 but may be located remote from the processor 511. The input data and output data associated with the methods may or may not be stored as part of the computer arrangement 500. For example, the input data may be accessed via web services. It might even be possible, that an action is performed by a process running on another processor.

The processor 511 is also connected to means for inputting instructions, data etc. by a user, like a keyboard 516, and a mouse 517. Other input means, such as a touch screen, a track ball and/or a voice converter, known to persons skilled in the art may be provided too.

A reading unit 519 connected to the processor 511 may be provided. The reading unit 519 is arranged to read data from and possibly write data on a removable data carrier or removable storage medium, like a floppy disk 520 or a CDROM 521. Other removable data carriers may be tapes, DVD, CD-R, DVD-R, memory sticks, solid state memory (SD cards, USB sticks) compact flash cards, HD DVD, blue ray, etc. as is known to persons skilled in the art.

The processor 511 may be connected to a printer 523 for printing output data on paper, as well as to a display 518, for instance, a monitor or LCD (liquid Crystal Display) screen, head up display (projected to front window), or any other type of display known to persons skilled in the art.

The processor 511 may be connected to a loudspeaker 529 and/or to an optical reader 531, such as a digital camera/web cam or a scanner, arranged for scanning graphical and other documents.

Furthermore, the processor 511 may be connected to a communication network 527, for instance, the Public Switched Telephone Network (PSTN), a Local Area Network (LAN), a Wide Area Network (WAN), Wireless LAN (WLAN), GPRS, UMTS, the Internet etc. by means of I/O means 525. The processor 511 may be arranged to communicate with other communication arrangements through the network 527.

The data carrier 520, 521 may comprise a computer program product in the form of data and instructions arranged to provide the processor with the capacity to perform a method in accordance to the invention. However, such computer program product may, alternatively, be downloaded via the telecommunication network 527 into a memory component.

The processor 511 may be implemented as a stand alone system, or as a plurality of parallel operating processors each arranged to carry out subtasks of a larger computer program, or as one or more main processors with several sub-processors. Parts of the functionality of the invention may even be carried out by remote processors communicating with processor 511 through the telecommunication network 527.

The components contained in the computer system of FIG. 5 are those typically found in general purpose computer systems, and are intended to represent a broad category of such computer components that are well known in the art.

Thus, the computer system of FIG. 5 can be a personal computer, a workstation, a minicomputer, a mainframe computer, etc. The computer can also include different bus configurations, networked platforms, multi-processor platforms, etc. Various operating systems can be used including UNIX, Solaris, Linux, Windows, Macintosh OS, and other suitable operating systems.

Figure 11:
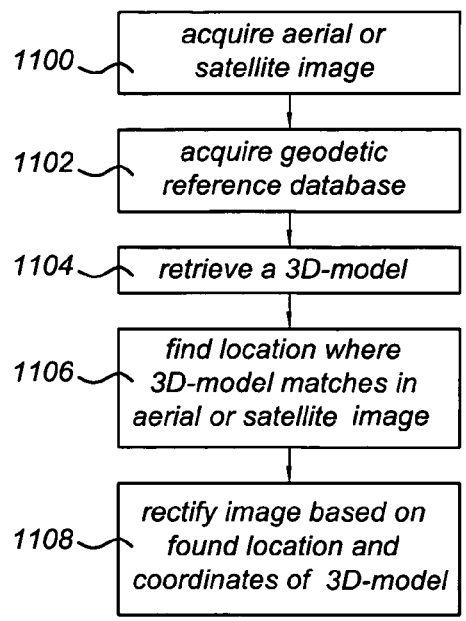
FIG. 11 shows a flow diagram of a method for rectifying a aerial or satellite image; and, FIG. 12 shows a flow diagram of a method for correcting a DEM.

FIG. 11 shows a flow diagram of a method for rectifying an aerial or satellite image. In action 1100 the aerial or satellite image is acquired. Preferably, the image is a perspective view image and not an orthorectified image of the perspective view image as the orthorectified image could comprise distortions induced from the performed orthorectification process which cannot be corrected or could cause additional distortions when performing the rectifying process. In action 1102, the geodetic reference database comprising 3D-model obtained by the present invention is acquired. In action 1104, a 3D-model is retrieved from the geodetic reference database. Preferably, only 3D-models are selected which are expected to be covered by the image to be rectified. In action 1106, in the image is searched for a location where the 3D-model matches. The 3D-model describes the boundaries of a photo-identifiable area. Therefore, corresponding matching areas could be found in the image. An orthorectified view of the 3D model could be used to find a matching area.

Normally, the position of the digital camera taking the aerial or satellite image is known in the coordinate reference system. This allows us to transform the 3D model into a perspective view image as seen from the position of the digital camera and to find the corresponding location in the image. This transformation improves the success of finding the correct location in the image. After finding locations, neighboring 3D-models are used to find the corresponding locations in image. This process is repeated until neighboring 3D-models fall aside the image. In this way, the associations between the 3D-models and corresponding locations in the image, provide the input to rectify the image in action 1108. Each matching 3D-model is used as a Ground Control Object. Now all 3D-model having a location falling inside the assumed area of the earth surface visualized by the perspective image are used as DSM on which the images should be projected. The matching locations in the image in combination with the corresponding 3D-model enables us to orthorectify correctly the image parts corresponding to said matching locations. The areas not covered by the 3D-models forming the network, can be rectified by means of commonly known rectification algorithms.

Figure 12:
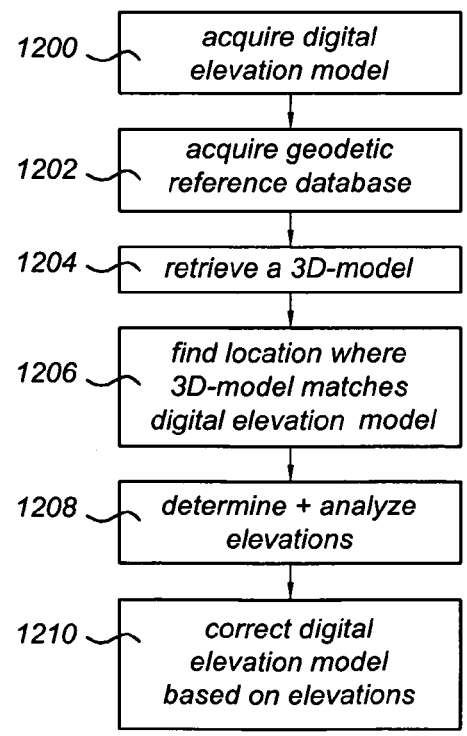

FIG. 12 shows a flow diagram of a method for correcting a DEM. In action 1200, a digital elevation model or digital surface model to be corrected is acquired. In action 1202, the geodetic reference database is acquired. In action 1204, one or more 3D-models are retrieved from the geodetic reference database. In action 1206, a location is searched where the one or more 3D-model matches the digital elevation model. In action 1208, the deviations between the coordinates in the coordinate reference system of the 3D-model and the location in the DEM is determined. The deviations are analyzed to determine the kind of error. The error could be a translation error, a scaling error, a local error. Based on the analyze results, i.e. the kind of error, in action 1210, the digital elevation model is corrected. The method for correcting a DEM could further be adapted to improve the triangulation of a DEM which includes color information representative of the earth surface. A DEM can be represented as a raster (a grid of squares) or as a triangular irregular network. When using Delaunay Triangulation, the minimum angle of all the angles in the triangulation is maximized. They tend to avoid skinny triangles. However, a quadrangle formed by 4 points have two possible triangulations. Action 1210 is now further adapted to use 3D-models which describe the outer edges of a road segment, which has a planar or soft rounded surface, as break lines to control the triangulation. The 3D-model representative of a road segment describes the outer edges of a soft rounded surface area. In an embodiment, the break lines are used to add additional elevation to the DEM and the triangulation uses said additional point. In another embodiment, action 1210 is adapted to select the one of the two possible triangulations which corresponds best to the surface defined by the 3D-model.

The geodetic database according to the invention could further be used to improve locally a DEM/DSM by adding a dense point network corresponding to a 3D-model representative of a road segment to said DEM/DSM. The 3D-model could also be used to replace a corresponding part of the DEM/DSM. This provides a DEM/DSM that could be used in navigation applications, such as ADAS applications and the like.

The foregoing detailed description of the invention has been presented for purposes of illustration and description. It is not intended to be exhaustive or to limit the invention to the precise form disclosed, and obviously many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

The invention is claimed is:

1. A method of generating, by a computer implemented system comprising one or more processors, a geodetic reference database product, the method comprising:

acquiring, by the one or more processors, mobile mapping data captured by means of digital cameras, range sensors and position determination means mounted to a vehicle driving across the earth surface, the mobile mapping data comprising simultaneously captured image data, range data and associated position data in a geographic coordinate system;

determining, by the one or more processors, linear stationary earth surface features from the mobile mapping data by processing the image data, range data and associated position data;

generating, by the one or more processors, 3D-models for the linear stationary earth surface features in the geographic coordinate system from the image data, range data and associated position data; and storing, by the one or more processors, the 3D-models in a database to obtain the geodetic reference database product; the method further comprising:

generating, by the one or more processors, orthorectified images for the 3D-models by combining image data and range data, determining, by the one or more processors, elevation information in the geographic coordinate system for pixels of the orthorectified images;

linking, by the one or more processors, the orthorectified images and the elevation information to obtain 3D-orthorectified images; and storing, by the one or more processors, the 3D-orthorectified images and linking the images to respective 3D-models in the geodetic database product.

2. A method according to claim 1, wherein the method further comprises:
linking the 3D-models to obtain a continuous linear control network; and
storing the continuous linear control network in the geodetic reference database product.

3. A method according to claim 1, wherein a linear stationary earth surface feature corresponds to a linear characteristic of a road segment selected from a group of features comprising: road centerline, left road edge, right road edge, road width.

4. A method according to claim 1, wherein determining linear stationary earth surface features comprises:
detecting a road surface in the image data; and
extracting the position of the road surface in the geographic coordinate system by combining the image data, range data and associated position data;
calculating one or more poly lines representing the linear stationary earth surface feature from the position of the road surface.

5. A method according to claim 1, wherein the 3D-model is based on vectors.

6. A method according to claim 1, further comprising:
acquiring a digital elevation model;
retrieving a 3D-model from the geodetic reference database wherein the 3D-model describes outer edges of a soft rounded surface area;
finding locations where the 3D-model matches in the digital elevation model; and,
using the outer edges of the soft rounded surface area as break lines to control the triangulation of the digital elevation model.

7. A method according to claim 1, further comprising:
acquiring a digital elevation model;
retrieving one or more 3D-models from the geodetic reference database;
finding locations wherein the 3D-models match the digital elevation model;

determining positional deviations between position of the found locations in the digital elevation model and the coordinates associated with the one or more 3D-models; and,
using the positional deviations to correct the geographical coordinates of the digital elevation model.

8. A method according to claim 2, further comprising:
acquiring an aerial or satellite image;
acquiring a geodetic reference database product;
retrieving one or more 3D-models and corresponding coordinates from the geodetic reference database;
finding locations in the image where the one or more 3D-models match with the aerial or satellite image; and
using the position of the 3D-models in the coordinate reference system and corresponding find locations to rectify the aerial or satellite image.

9. A computer implemented system comprising a processor and memory connected to the processor, the memory comprising a computer program comprising data and instructions arranged to allow said processor to perform the method according to claim 1.

10. A processor readable medium provided with a computer program product comprising data and instructions that can be loaded by a computer arrangement, allowing said computer arrangement to perform the method according to claim 1.

11. The method according to claim 1, wherein the elevation information defines a height difference between the height of a xy-position of the real world surface and the height of the 3D model of the earth with respect to a point on a geoid surface at said xy-position.

12. The method according to claim 1, further comprising:
determining at least one linear stationary earth feature having visually detectable edges and a surface without discontinuities, and
approximating said at least one linear stationary earth feature by a planar surface between the edges.

13. A geodetic reference database product, wherein the product comprises:
3D-models representative of linear stationary earth surface features; and
orthorectified images representative of at least a part of the earth surface represented by a 3D model, wherein a pixel of an orthorectified image comprises associated elevation information, wherein the 3D-models and orthorectified images have been produced by:
acquiring mobile mapping data comprising simultaneously captured image data, range data and associated position data in a geographic coordinate system, said data being captured by means of digital cameras, range sensors and position determination means mounted to a vehicle driving across the earth surface;
determining linear stationary earth surface features from the mobile mapping data by processing the image data, range data and associated position data;
generating 3D-models for the linear stationary earth surface features in the geographic coordinate system from the image data and associated position data;
storing the 3D models in a database to obtain the geodetic reference database product;
generating orthorectified images for the 3D-models by combining image data and range data,
determining elevation information in the geographic coordinate system for pixels of the orthorectified images;
linking the orthorectified images and the elevation information to obtain 3D-orthorectified images; and storing the 3D-orthorectified images and linking the images to respective 3D-models in the geodetic database product.

14. The geodetic reference database product according to claim 13, wherein the elevation information defines a height difference between the height of a xy-position of the real world surface and the height of the 3D model of the earth with respect to a point on a geoid surface at said xy-position.

15. The geodetic reference database product according to claim 13 wherein the 3D-models and orthorectified images are produced further by:
   determining at least one linear stationary earth feature having visually detectable edges and a surface without discontinuities, and
   approximating said at least one linear stationary earth feature by a planar surface between the edges.

* * * * *